No. 887,340. PATENTED MAY 12, 1908.
R. F. MOSS.
PEANUT DIGGER.
APPLICATION FILED MAR. 7, 1907.
2 SHEETS—SHEET 2.
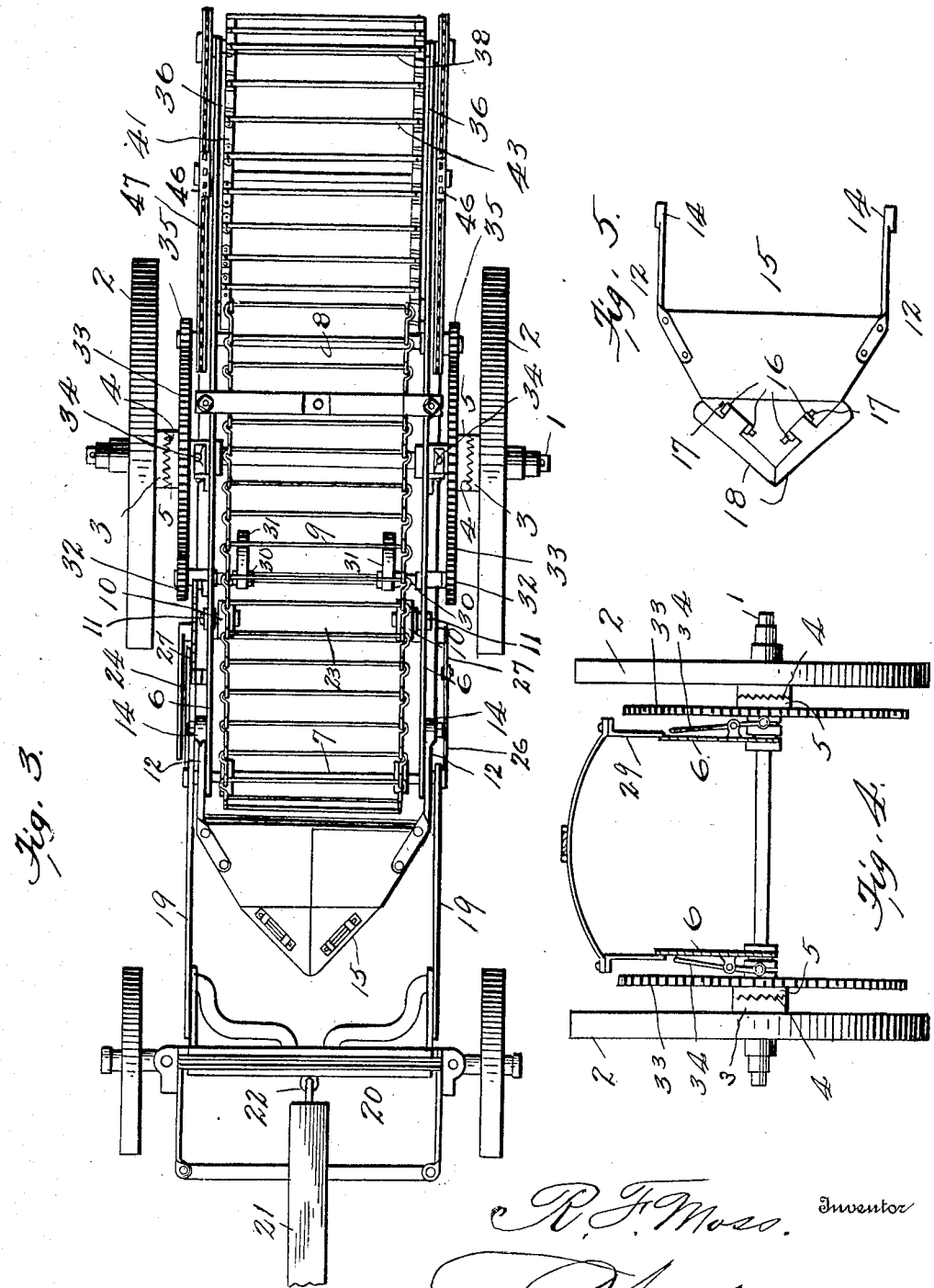
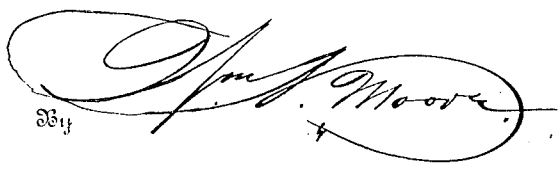

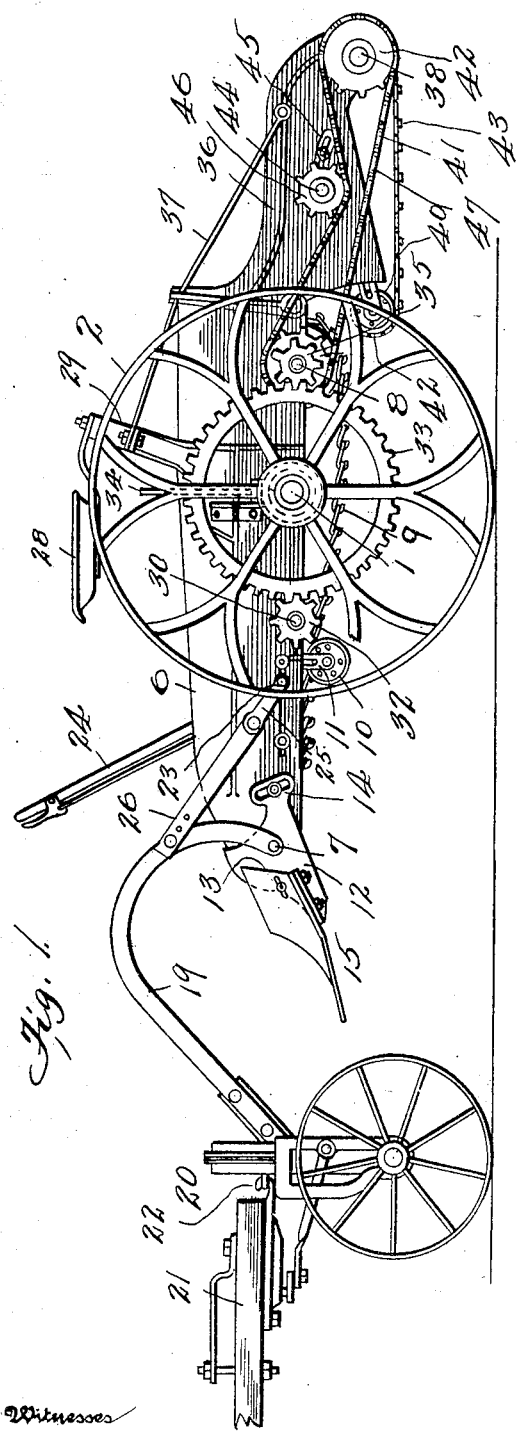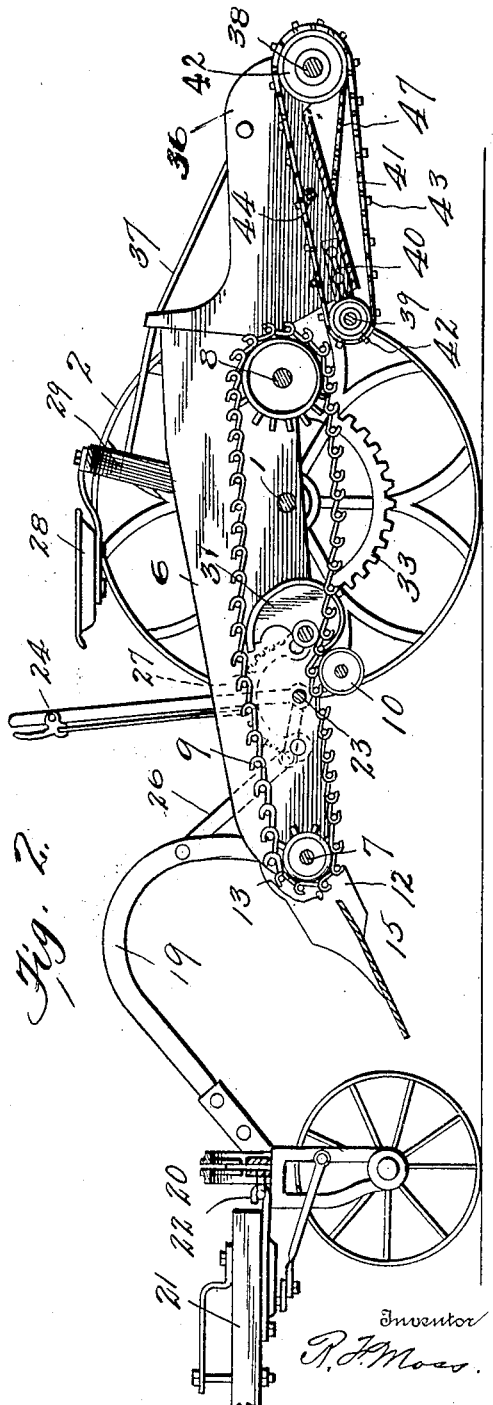

UNITED STATES PATENT OFFICE.

RICHELIEU F. MOSS, OF BOOKER, VIRGINIA.

PEANUT-DIGGER.

No. 887,340.  Specification of Letters Patent.  Patented May 12, 1908.

Application filed March 7, 1907. Serial No. 361,047.

*To all whom it may concern:*

Be it known that I, RICHELIEU F. MOSS, a citizen of United States, residing at Booker, in the county of Sussex and State of Virginia, have invented certain new and useful Improvements in Peanut-Diggers, of which the following is a specification.

My invention relates to improvements in peanut diggers, and has for its object, the provision of improved and simplified mechanism for accomplishing the harvesting of peanuts or similar crops, which shall be durable in construction, and thoroughly practical and efficient in operation.
The invention further consists of a peanut digger embodying certain other novel features of construction, combination and arrangement of parts, substantially as disclosed herein and as illustrated in the accompanying drawings, in which:

Figure 1, is a side elevation of my improved peanut digger. Fig. 2, is a longitudinal sectional view taken through the body of the machine. Fig. 3, is a bottom plan view of the machine. Fig. 4, is an elevation of the main axle and the clutch mechanisms thereon. Fig. 5, is a detail bottom view of the shovel and mold boards.

In the accompanying drawings: the numeral 1, designates the main shaft or axle, upon the ends of which are journaled in the usual manner, the supporting and driving wheels 2, the inner ends of the hubs of these wheels being preferably provided with ratchet teeth 3, to be engaged by the similar ratchet teeth 4, on the sliding clutch members 5, the use of which will be described later. The throat or body portion of the machine is formed with the parallel sides 6, between the forward ends of which is journaled the carrier shaft 7, and between the rearward ends of which is journaled a similar carrier shaft 8, the endless main conveyer, 9, being supported upon these two shafts, the lower side of this main conveyer being supported on slack-adjusting rollers 10, journaled in the slotted links 11, which are adjustably pendent from the body of the machine. Angular bracket plates 12, are pivotally secured at 13, to the sides of the throat at the forward end, and by means of a slotted rearward extension 14, may be clamped to the sides at any required incline.

Secured to said brackets is a depending shovel or plow 15, having a pointed nose to enter the ground. On the lower face of the plow near each angular edge, is provided a pair of spaced lugs 16, through which are passed securing pins 17. The mold boards 18, are each provided with a tubular extension adapted to fit between the lugs 16, on the plow with the securing pin passing therethrough, so that by means of this connection, the mold boards are removable, and different mold boards to suit different conditions in the soil, etc., may be readily secured in position upon the plow.

Plow beams 19, are secured to the bracket plates 12, and the forward ends of the beams are pivotally engaged in the arched axle 20. A pole 21, is pivotally secured to the forward side of the axle 22, to which suitable double trees may be attached as desired. A rock shaft 23, is journaled to the body portion of the machine, to one end of which is affixed the operating lever 24, which by means of the rocker arms 25 and connecting links 26, serves to raise and lower the plow point, a ratchet and segment plate 27, serving to retain the parts in the proper position. The operators seat 28 is suitably supported upon the standards 29. Stub shafts 30 are journaled in the sides of the throat forward of the axle, which upon their inner ends carry the agitator cams 31, having smooth cam surfaces adapted to engage and shake the main conveyer. Pinions 32, are mounted on the outer ends of the stub shafts and are driven from the large spur gears 33, which large gears are either integral with or are affixed to the sliding clutch members 5, the clutch members being thrown into and out of mesh with the teeth on the supporting wheels, by means of the levers 34, which are fulcrumed to the standards 29, these last-named parts being best shown in Fig. 4. The main conveyer is driven by means of the small pinions 35, on the outer ends of the rear shaft 8, which mesh with the large gears carried by the clutch members.

Extending rearward from the sides of the throat are the pair of depending side boards 36, the outer ends of which are further supported by a brace rod 37. A shaft 38, is journaled in the extreme rear of the side boards 36, and another shaft 39, is journaled in the pair of slotted links or brackets 40, these brackets being adjustably secured at the forward end of the side boards. Sprocket chains 41, pass over the sprocket wheels 42, on the shafts 38 and 39, and secured to the sprocket chains are the cross bars 43. This last described or auxiliary conveyer is adapted to receive the plants from the main conveyer after most of the earth has been shaken therefrom, and as it is geared to run at a slower rate of speed, the plants are deposited in piles upon the ground. An extra shaft 44, is journaled between the side boards 36, in the adjustable slotted bracket plates 45, which carries upon its outer ends the pinions 46, for engagement with the sprocket chains 47, these last named sprocket chains serving to convey motion from the extra sprocket wheels on the shaft 8, to the auxiliary conveyer.

From the foregoing description taken in connection with the drawings, the many advantages and general usefulness of my invention will be at once evident, and it will be obvious that I have provided a peanut digger which accomplishes all the results herein set forth as the object of the invention.

I claim:

1. In combination with the main conveyer of a peanut digger, adjustable roller supports for the lower run of the conveyer, a transverse shaft journaled beneath the upper run of the conveyer, and cams on said shaft having smooth cam bearing surfaces to engage and support the upper run of the conveyer.

2. The peanut digger herein shown and described consisting of the body portion and sides of the machine, the axle and wheels supporting the body portion, a main conveyer mounted in the body portion of the machine between the sides, gears slidably mounted on the axle to make clutch engagement with the wheels, one of the gears making operative connection for operating the conveyer, slack adjusting rollers adjustably dependent from the sides to support the lower run of the main conveyer, a cam shaft journaled between the sides having operative engagement with the other gear, cams on the said shaft engaging and supporting the upper run of the conveyer said cams having smooth cam bearing surfaces.

In testimony whereof I affix my signature in presence of two witnesses.

RICHELIEU F. MOSS.

Witnesses:
    WM. N. MOORE,
    CAROLINE OSBORN.